US012694018B2

(12) United States Patent
Lambert

(10) Patent No.: US 12,694,018 B2
(45) Date of Patent: Jul. 28, 2026

(54) AI RESPONSES BY COMPARISON

(71) Applicant: Mark Lambert, Tarpon Springs, FL (US)

(72) Inventor: Mark Lambert, Tarpon Springs, FL (US)

(73) Assignee: Mark Lambert, Tarpon Springs, FL (US)

( * ) Notice: Subject to any disclaimer, the term of this patent is extended or adjusted under 35 U.S.C. 154(b) by 0 days.

(21) Appl. No.: 19/033,362

(22) Filed: Jan. 21, 2025

(65) Prior Publication Data

US 2026/0211871 A1     Jul. 23, 2026

(51) Int. Cl.
*G06F 7/00*          (2006.01)
*G06F 16/22*         (2019.01)
*G06F 16/242*        (2019.01)
*G06F 16/248*        (2019.01)

(52) U.S. Cl.
CPC ........ *G06F 16/243* (2019.01); *G06F 16/2237* (2019.01); *G06F 16/248* (2019.01)

(58) Field of Classification Search
CPC ............. G06F 16/9538; G06F 16/9038; G06F 16/9577; G06F 16/338; G06F 16/9535; G06F 16/248; G06F 16/243; G06F 16/2237; G06F 16/3347; G06F 16/3344; G06F 16/332; G06F 16/3322; G06F 16/35; G06F 16/2456; G06F 16/2465; G06F 16/2471; G06F 16/24575; G06F 16/2453; G06F 16/2457; G06N 5/04; G06N 5/01; G06N 5/02; G06N 5/048; G06N 5/022; G06N 20/00; G06N 20/20; G06N 5/018; G06N 3/105; G06N 3/044; G06N 3/082
See application file for complete search history.

(56) References Cited

U.S. PATENT DOCUMENTS

| | | | |
|---|---|---|---|
| 10,325,070 B2 * | 6/2019 | Beale .................... | G16H 30/20 |
| 12,235,882 B1 * | 2/2025 | Chawla ................. | G06F 16/285 |
| 12,277,489 B1 * | 4/2025 | Pradeep Shetty .... | G06N 3/0455 |
| 2020/0327118 A1 * | 10/2020 | Ahmed ................ | G06F 16/248 |
| 2025/0294048 A1 * | 9/2025 | Jin .......................... | H04L 63/20 |

* cited by examiner

*Primary Examiner* — Mohammad A Sana
(74) *Attorney, Agent, or Firm* — Perkins Coie LLP; Lena Petrovic; Ben Brokesh

(57)          ABSTRACT

The present technology enhances AI responses by leveraging multiple natural language processing models. The system receives an input prompt, which is processed by various Component AIs, such as ChatGPT, Google Gemini, and others. Each Component AI generates a response, which is then compared by an Ensemble AI. The Ensemble AI evaluates agreements, disagreements, and unique contributions among the responses using techniques like cosine similarity and Euclidean distance. Based on these comparisons, the Ensemble AI produces a comprehensive and reliable output. The system can dynamically select and update Component AIs based on the input's subject matter and prompt type, ensuring the most relevant models are utilized. Additionally, the system includes a fact-checking mode to resolve discrepancies and enhance response accuracy. This method ensures a more accurate and complete AI-generated response by integrating and comparing outputs from multiple AI models.

30 Claims, 9 Drawing Sheets

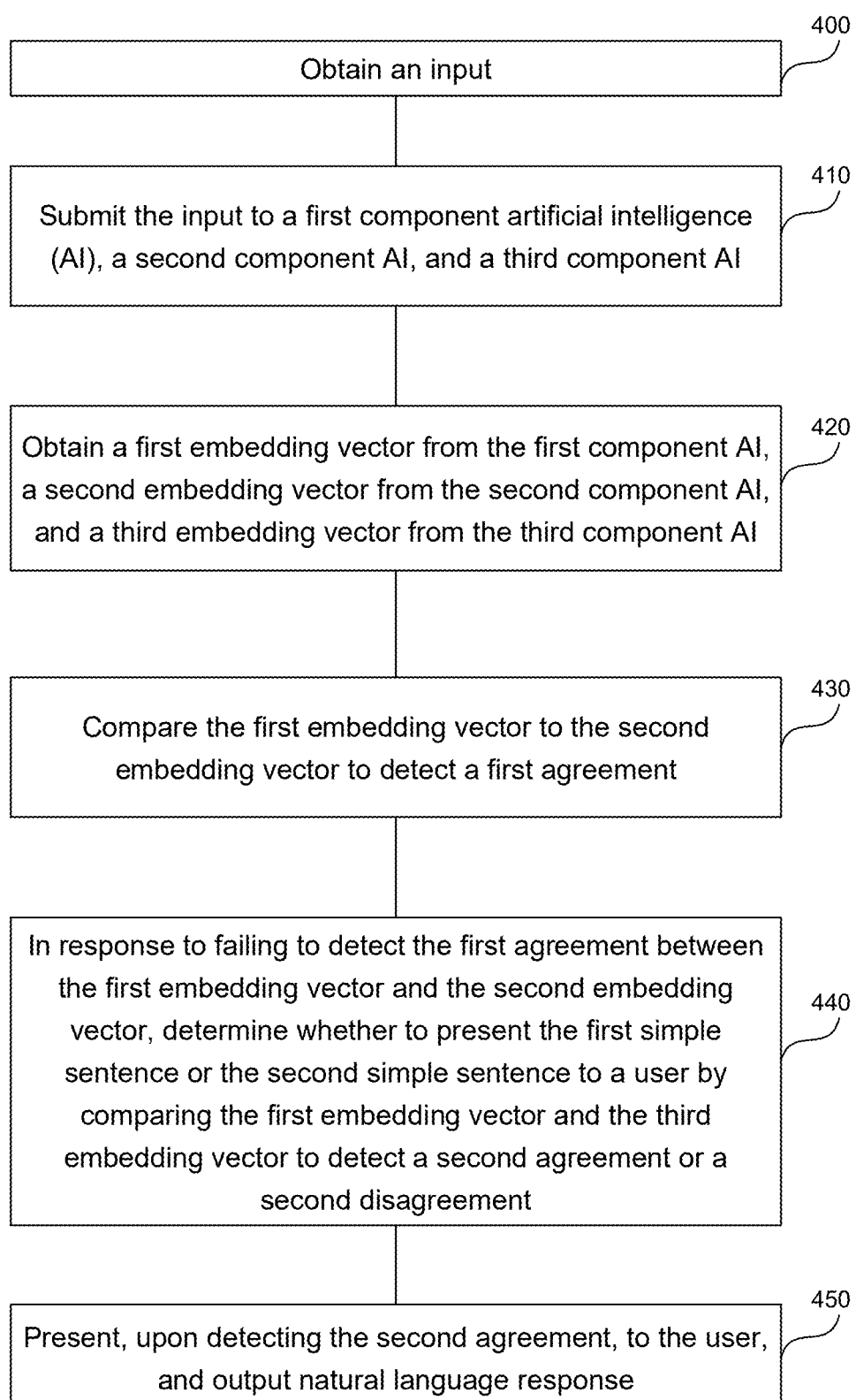

400

Obtain an input

410

Submit the input to a first component artificial intelligence (AI), a second component AI, and a third component AI

420

Obtain a first embedding vector from the first component AI, a second embedding vector from the second component AI, and a third embedding vector from the third component AI

430

Compare the first embedding vector to the second embedding vector to detect a first agreement

440

In response to failing to detect the first agreement between the first embedding vector and the second embedding vector, determine whether to present the first simple sentence or the second simple sentence to a user by comparing the first embedding vector and the third embedding vector to detect a second agreement or a second disagreement

450

Present, upon detecting the second agreement, to the user, and output natural language response

*FIG. 4*

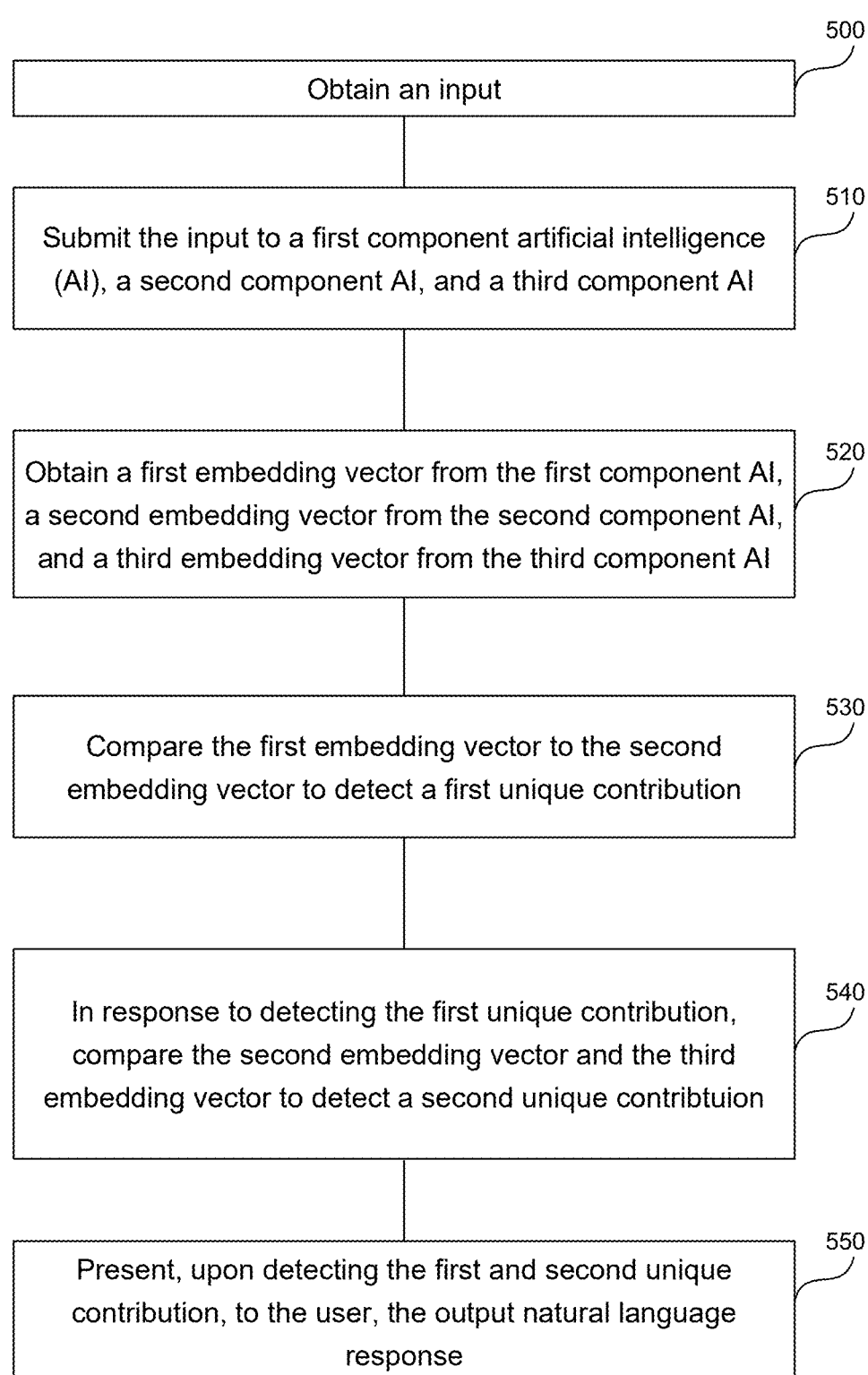

500

Obtain an input

510

Submit the input to a first component artificial intelligence (AI), a second component AI, and a third component AI

520

Obtain a first embedding vector from the first component AI, a second embedding vector from the second component AI, and a third embedding vector from the third component AI

530

Compare the first embedding vector to the second embedding vector to detect a first unique contribution

540

In response to detecting the first unique contribution, compare the second embedding vector and the third embedding vector to detect a second unique contribtuion

550

Present, upon detecting the first and second unique contribution, to the user, the output natural language response

AI RESPONSES BY COMPARISON

BACKGROUND

Artificial intelligence (AI) is intelligence exhibited by machines, particularly computer systems. It is a field of research in computer science that develops and studies methods and software that enable machines to perceive their environment and use learning and intelligence to take actions that maximize their chances of achieving defined goals. Such machines may be called AIs. The traditional goals of AI research include reasoning, knowledge representation, planning, learning, natural language processing, perception, and support for robotics. General intelligence—the ability to complete any task performed by a human on an at least equal level—is among the field's long-term goals. In a manner analogous to electricity or computers, AI serves as a general-purpose technology. AI programs emulate perception and understanding and are designed to adapt to new information and new situations.

AIs are quickly becoming an integral part of modern life, changing how humans complete tasks and interact within a digital space in both personal and professional contexts. As AIs have become more ubiquitous, the need for more sophisticated tools to manage and optimize AI interactions has grown.

BRIEF DESCRIPTION OF THE DRAWINGS

Detailed descriptions of implementations of the present invention will be described and explained through the use of the accompanying drawings.

FIG. 4 is a flow diagram illustrating an example system to improve AI responses by comparison that determines agreements and disagreements between AI systems.

FIG. 5 is a flow diagram illustrating an example system to improve AI responses by comparison that determines a unique contribution between AI systems.

Figure 1:
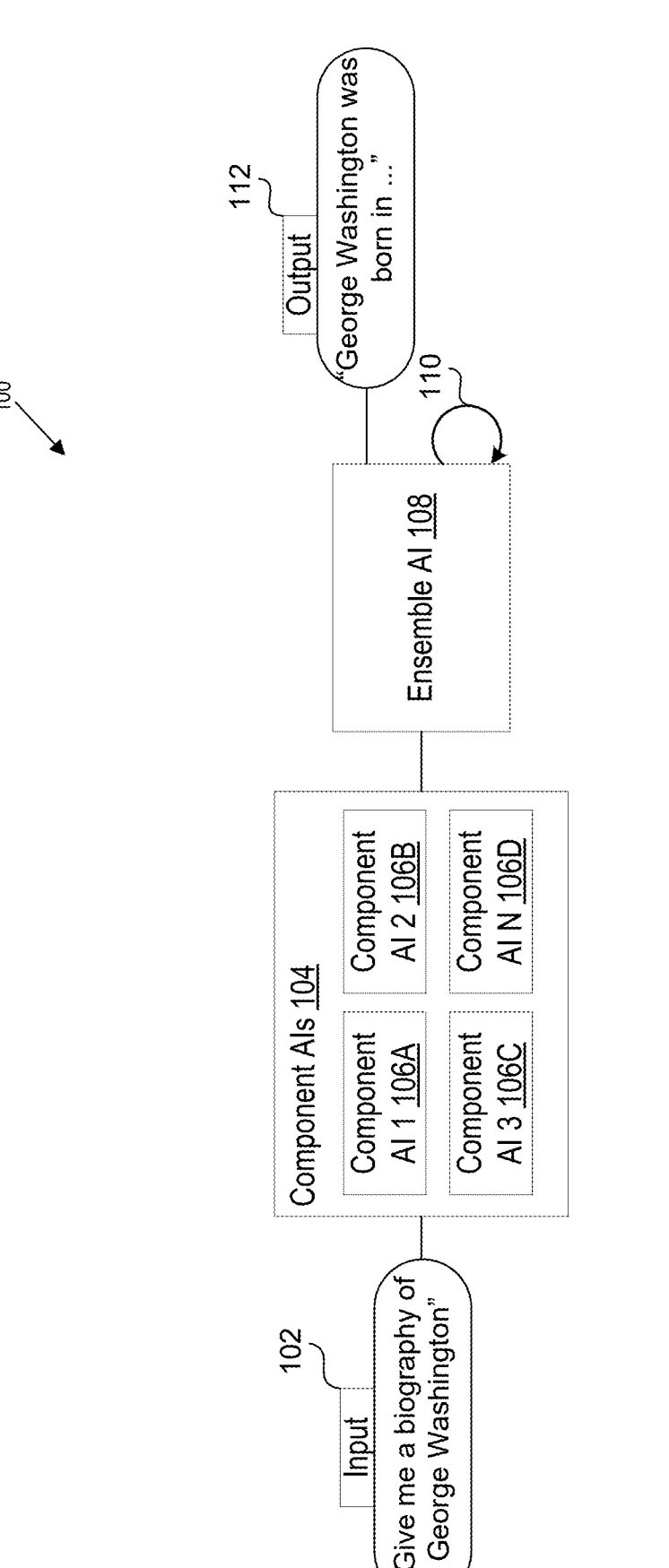
FIG. 1 illustrates a system to improve AI responses by comparison.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology is directed to enhancing AI system output through comparison of multiple AI system outputs. The system begins by obtaining a natural language prompt, a natural language query, or a combination of the two as an input. This input is submitted to a first, second, and third component AI, each of which returns a natural language response to the input. The system then obtains an embedding vector (a first, second, and third) from each component AI. These embedding vectors are numerical vectors in a multidimensional space that represent simple sentences (e.g., a first, second, and third simple sentence) corresponding to the natural language responses to the input from each component AI.

The system then uses these embedding vectors to detect agreements and disagreements between the component AIs and unique contributions from the component AIs. To do so, the system compares the first embedding vector to the second embedding vector. Specifically, the system compares the distance in the multidimensional space between the first embedding vector and the second embedding vector to a first threshold distance that represents an agreement between embedding vectors. When the system fails to detect an agreement between the first and second component AIs, the system compares the first embedding vector to the third embedding vector. In comparing the first embedding vector to the third embedding vector, the system identifies the distance in the multidimensional space between the first and third embedding vectors. This distance is compared to both the first threshold distance representing agreements between embedding vectors and to a second threshold distance that represents a disagreement between embedding vectors.

When the system fails to detect an agreement between the first and second component AIs, instead of then comparing the first embedding vector to the third embedding vector, the system can compare the first embedding vector to the second embedding vector to detect a first unique contribution. The comparison detects the first unique contribution by comparing the distance in the multidimensional space between the first and second embedding vectors to a third threshold distance that represents a unique contribution between embedding vectors. When the system detects the first unique contribution, the system then compares the second embedding vector to the third embedding vector to detect a second unique contribution. The comparison detects the second unique contribution by comparing the distance in the multidimensional space between the second and third embedding vectors to the third threshold distance representing a unique contribution between embedding vectors.

After detecting the agreements, disagreements, and unique contributions, the system can present a natural language response output to a user. When the system detects an agreement between the first and third embedding vectors, the system bases the output natural language response on the first simple sentence, the third simple sentence, or both. When the system detects the first and second unique contribution, the system bases the output natural language response on the second simple sentence.

Improving AI Responses by Comparison

FIG. 1 illustrates a system 100 to improve AI responses by comparison. System 100 includes obtaining an input 102. Input 102 is a natural language prompt, a natural language query, or a combination of the two as an input. For example, Input 102 can be a natural language prompt formed as the request "Give me a biography of George Washington." Input 102 can be generated by a user of system 100, a computing device associated with system 100, a separate AI associated with system 100, the Component AIs 104, and Ensemble AI 108.

Input 102 is transmitted to Component AIs 104. Component AIs 104 are comprised of Component AI 1 106A, Component AI 2 106B, Component AI 3 106C, and Component AI N 106D. Component AI 1 106A, Component AI 2 106B, Component AI 3 106C, and Component AI N 106D are individual AIs such as ChatGPT, Google Gemini, Meta LLaMA, Apple Siri, Microsoft Copilot, or other natural language processing models. In some embodiments, each of the Component AIs 104 are different natural language processing models. In some embodiments, system 100 uses only two component AIs. In other embodiments, system 100 uses more than two component AIs. Component AI N 106D represents the ability of system 100 to use an unbounded number of component AIs.

Component AIs 104 can be selected through a variety of techniques. In some embodiments, a user pre-selects the natural language models for system 100 to use as Component AIs 104. In other embodiments, system 100 uses all natural language models it has access to as Component AIs 104. System 100 can continually update which natural language models are accessible by system 100.

In some embodiments, system 100 determines which natural language models to use as Component AIs 104 based on Input 102. When system 100 determines which natural language models to use as Component AIs 104 based on Input 102, system 100 can determine a subject matter and a prompt type of the Input 102. A subject matter can relate to the subject of Input 102. A prompt type can relate to the structure of Input 102. For example, if the input is "Give me a biography of George Washington," system 100 can identify that the subject matter of Input 102 is US history and that the prompt type is a request for information in natural language form. Then, based on the subject matter and prompt type identified by system 100, system 100 can select natural language models trained to output historiographical information to use as Component AIs 104. As another example, if the input is "give me a list of parts I would need for a circuit to moderate power flow from a solar panel," system 100 can identify that the subject matter of Input 102 is electrical engineering and that the prompt type is a request for a list. Then, based on the subject matter and prompt type identified by system 100, system 100 can select natural language models trained on electrical engineering and circuit components.

In response to Input, Component AIs 104 each generate a natural language response. These natural language responses from Component AIs 104 are transmitted to Ensemble AI 108. Ensemble AI 108 is configured to compare the natural language responses from Component AIs 104 to generate an Output 112 that is more reliable and complete than a response from a single component AI. As such, when Ensemble AI 108 identifies an agreement among the natural language responses of the Component AIs 104, Ensemble AI 108 generates an Output 112. When Ensemble AI 108 identifies a disagreement among the natural language responses of the Component AIs 104 or a unique contribution from one or more of the natural language responses of the Component AIs 104, the Ensemble AI 108 initiates a fact-checking mode 110 that continues the comparison process. Fact-checking mode 110 uses the number of agreements, disagreements, and unique contributions recorded to determine the next steps. This process is described in more detail with reference to FIG. 3 below.

Output 112 is a natural language response to Input 102, generated by Ensemble AI 108 based on the natural language responses of the Component AIs 104. In some embodiments, Output 112 comprises a summary of the natural language responses of the Component AIs 104. In such a summary, to deliver the most reliable and complete response to the given input, the information that each of the Component AIs 104 agree upon is shown first, the information with some agreement and some disagreement between the Component AIs 104 is shown next, the information from unique contributions of one or more Component AIs 104 is shown next, and the information with complete disagreement is shown last. In some embodiments, the full results from each component AI (including the additional component AIs described below with respect to FIG. 3) used by the Ensemble AI 108 are presented at Output 112. In other embodiments, Output 112 only includes information agreed upon by two or more of the component AIs. In some embodiments, Output 112 identifies the differences between the natural language response of each of the component AIs for each disagreement. In some embodiments, Output 112 includes citations and links to the resources used by each of the Component AIs 104 to develop their natural language responses. In some embodiments, Output 112 is structured as a list. In other embodiments, Output 112 is structured in paragraph form.

Figures 2A, 2B:
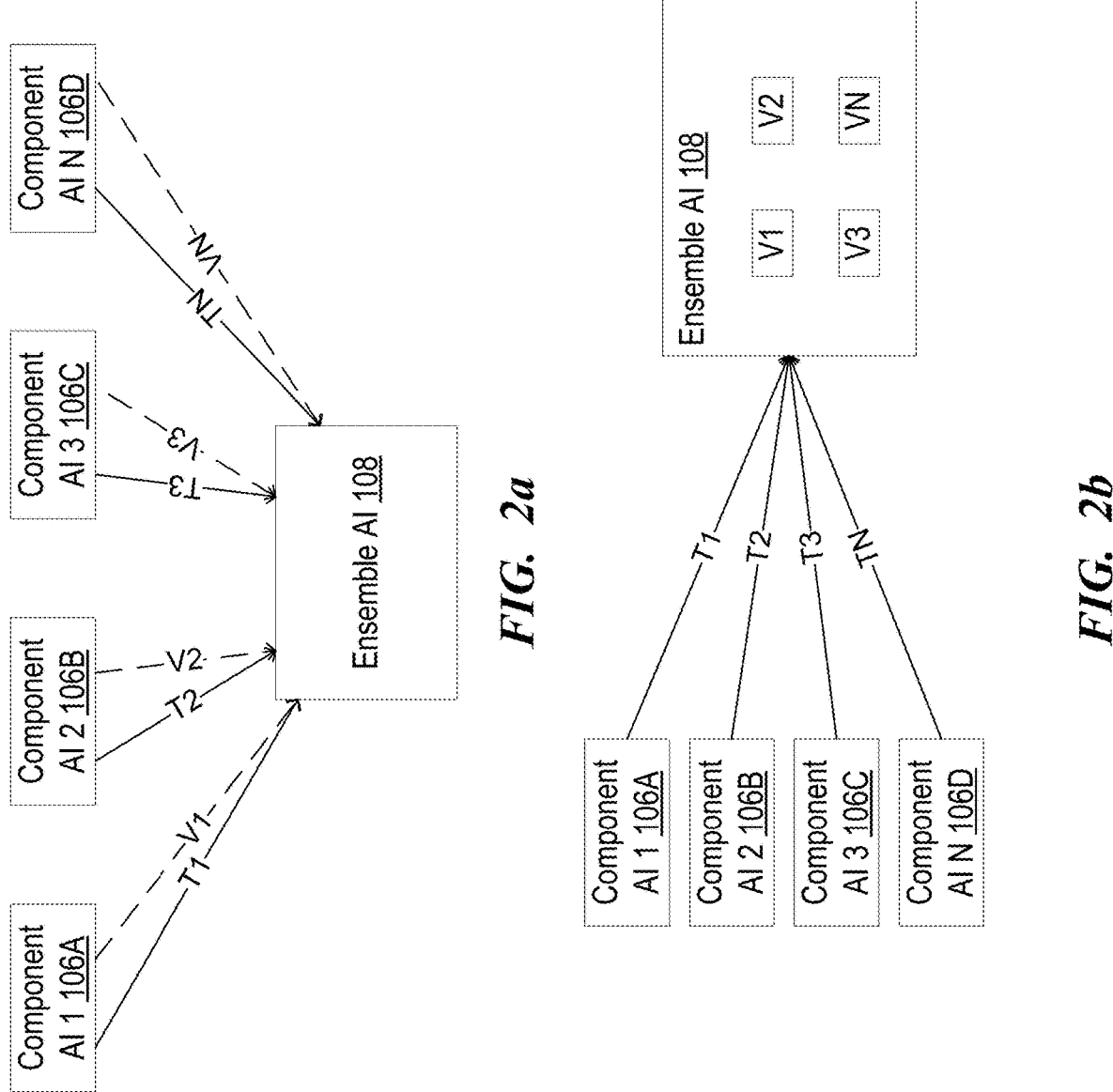
FIGS. 2a and 2b illustrate two techniques to transmit natural language responses from component AIs to an Ensemble AI.

FIGS. 2a and 2b illustrate two techniques to transmit the natural language responses from Component AIs 104 to Ensemble AI 108. In FIG. 2a, Component AI 1 106A, Component AI 2 106B, Component AI 3 106C, and Component AI N 106D generate natural language responses (to Input 102) that include the text (represented by T1-TN) and embedding vectors (represented by V1-VN) that correspond to the text. This text (T1-TN) and the corresponding embedding vectors (V1-VN) are transmitted to Ensemble AI 108 for its comparison process. In FIG. 2b, Component AI 1 106A, Component AI 2 106B, Component AI 3 106C, and Component AI N 106D generate natural language responses (to Input 102) that include the text (represented by T1-TN) but do not include embedding vectors. Upon receipt of the transmission of the text (T1-TN), the Ensemble AI 108 generates embedding vectors (V1-VN) that correspond to the text (T1-TN).

In the disclosed technology, an embedding vector is a numerical vector that represents objects, such as words or sentences, in a multidimensional space. These vectors are used in various machine learning and natural language processing (NLP) tasks to capture the semantic meaning and relationships between objects. Embedding vectors are particularly useful because they allow complex data to be represented in a way that can be easily processed by machine learning algorithms. They typically have a fixed number of dimensions and are trained from large datasets using machine learning techniques, ensuring that semantically similar objects are represented by vectors that are close to each other in the embedding space.

In some embodiments, the embedding vectors of the disclosed technology correspond to simple sentences of the text (T1-TN) of the natural language responses from each component AI. In some embodiments, each of the Component AIs 104 are configured to return their natural language responses with only simple sentences. In other embodiments, Ensemble AI 108 is configured to segment the natural language response of each of the Component AIs 104 into simple sentences. A simple sentence is a sentence structure that contains a single independent clause. For example, the sentence "George Washington was born on Feb. 22, 1732, and he was the first of six children of Augustine and Mary Ball Washington" can be represented by two simple sentences: "George Washington was born on Feb. 22, 1732;" and "He was the first of six children of Augustine and Mary Ball Washington."

In FIG. 2a, Component AI 1 106A, Component AI 2 106B, Component AI 3 106C, and Component AI N 106D generate a natural language response (to Input 102) whose text (represented by T1-TN) is composed entirely of simple sentences. Each sentence is given an embedding vector. The collection of embedding vectors for the natural language response of Component AI 1 106A is represented by V1. Each component AI transmits their simple sentence text (T1-TN), and the corresponding embedding vectors (V1-VN) to Ensemble AI 108.

In FIG. 2b, Component AI 1 106A, Component AI 2 106B, Component AI 3 106C, and Component AI N 106D generate a natural language response (to Input 102) whose text (represented by T1-TN) is not comprised solely of simple sentences. Ensemble AI 108 then segments each natural language response (T1-TN) into simple sentences and generates embedding vectors for each simple sentence.

Figure 3:
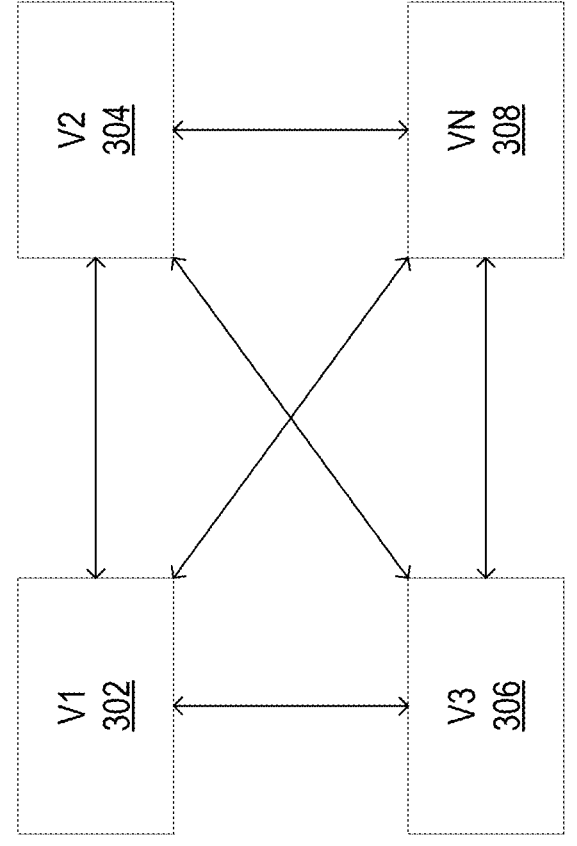
FIG. 3 illustrates an example process of an Ensemble AI to compare component AIs.

FIG. 3 illustrates an example comparison process carried out by Ensemble AI 108 to compare Component AIs 104. V1 302, V2 304, V3 306, and VN 308 each represent one or more vectors corresponding to each of the natural language responses of Component AI 1 106A, Component AI 2 106B, Component AI 3 106C, and Component AI N 106D respectively. The comparison process carried out by Ensemble AI 108 compares embedding vectors V1 302, V2 304, V3 306, and VN 308 to determine agreements between, disagreements between, and unique contributions from Component AI 1 106A, Component AI 2 106B, Component AI 3 106C, and Component AI N 106D.

In the disclosed technology, comparing embedding vectors comprises comparing a distance between two embedding vectors in a multidimensional space to threshold values. The Ensemble AI 108 can use a variety of techniques to compare embedding vectors such as cosine similarity, Euclidean distance, Manhattan distance, calculating the dot product, and Jaccard similarity. Cosine similarity measures the cosine of the angle between two vectors, indicating how similar they are regardless of their magnitude. Euclidean distance calculates the straight-line distance between two vectors in the vector space, showing how far apart they are. Manhattan distance, also known as L1 distance, sums the absolute differences between the components of two vectors, reflecting the total distance traveled along the axes. The dot product measures the similarity between two vectors by multiplying corresponding components and summing the results. Jaccard similarity measures the similarity between two sets by dividing the size of their intersection by the size of their union.

In some embodiments, an agreement, disagreement, or unique contribution is identified by comparing the cosine similarity distance between two vectors (which represent simple sentences corresponding to the natural language response of two component AIs) to a threshold distance. In such embodiments, a threshold distance for an agreement between two vectors is 1, a threshold distance for a disagreement between two vectors is −1, and a threshold distance for a unique contribution between two vectors is 0. In some embodiments, the Ensemble AI 108 registers an agreement, disagreement, or unique contribution when the cosine similarity distance between the two vectors is substantially similar to the threshold distance for agreement, disagreement, or unique contribution. For an agreement, a cosine similarity distance between 0.7 and 1 can be considered substantially similar to an agreement threshold distance of 1. For a disagreement, a cosine similarity distance between −0.7 and −1 can be considered substantially similar to a disagreement threshold distance of −1. Finally, for a unique contribution, a cosine similarity distance between −0.3 and 0.3 can be considered substantially similar to a unique contribution threshold distance of 0.

As an example, in comparing V1 302, V2 304, V3 306, and VN 308, if the cosine similarity distance between V1 302 and V2 304 is 0.9, then the Ensemble AI 108 can determine that the simple sentence of Component AI 1 106A corresponding to embedding vector V1 302 and the simple sentence of Component AI 2 106B corresponding to embedding vector V2 304 have a similar meaning and thereby agree. Additionally, if the cosine similarity distance between V1 302 and V3 306 is −0.71, then the Ensemble AI 108 can determine that the simple sentence of Component AI 1 106A corresponding to embedding vector V1 302 and the simple sentence of Component AI 3 106C corresponding to embedding vector V3 306 have an opposite meaning and thereby disagree. Finally, if the cosine similarity distance between V1 302 and VN 308 is 0, then the Ensemble AI 108 can determine that the simple sentence of Component AI 1 106A corresponding to embedding vector V1 302 and the simple sentence of Component AI 4 106D corresponding to embedding vector VN 308 have unrelated meaning and that, depending on the comparison to other embedding vectors, the relevant simple sentences contain unique contributions.

The above describes how two embedding vectors are compared by Ensemble AI 108. To generate Output 112, in some embodiments, Ensemble AI 108 determines the number of agreements, disagreements, and unique contributions across all embedding vector comparisons initiated in response to Input 102. For Input 102 and Component AIs 104, the number of agreements, disagreements, and unique contributions determined by Ensemble AI 108 depends upon a comparison sequence used by Ensemble AI 108.

In some embodiments, Ensemble AI 108 compares all embedding vectors received or generated by Ensemble AI 108 at once. For example, Ensemble AI 108 can determine the cosine similarity distance between each embedding vector V1 302, V2 304, V3 306, and VN 308 and compare these cosine similarity distances to threshold distances (e.g., 1, 0, and −1). Based on this comparison, Ensemble AI 108 can determine which Component AIs have agreements, which have disagreements, and which include unique contributions. Ensemble AI 108 can also record the number of agreements, disagreements, and unique contributions identified.

In other embodiments, Ensemble AI 108 sequentially compares a single embedding vector received or generated by Ensemble AI 108 to the other embedding vectors. For example, Ensemble AI 108 can determine the cosine similarity distance between V1 302 and V2 304, then the cosine similarity distance between V1 302 and V3 306, and so on through finding the cosine similarity distance between V1 302 and VN 308. Ensemble AI 108 can compare these cosine similarity distances to threshold distances and record the number of agreements, disagreements, and unique contributions identified between the single embedding vector and the other embedding vectors.

In some embodiments, Ensemble AI 108 sequentially compares all embedding vectors corresponding to a single component AI to the embedding vectors of the other component AIs. For example, Ensemble AI 108 can compare the embedding vectors corresponding to Component AI 1 106A to the embedding vectors of Component AI 2 106B, then to Component AI 3 106C, and finally to Component AI N 106D. Based on this comparison, Ensemble AI 108 can determine and record the number of agreements, disagreements, and unique contributions identified between the Component AIs 104. A comparison process that sequentially compares a single component AI (or single embedding vector) to the remaining component AIs (or remaining embedding vectors) as described above can save time and processing power relative to a comparison process that compares all embedding vectors at once.

In some embodiments, Ensemble AI 108 chooses the component AI with the highest accuracy to sequentially compare to the other component AIs as described above. To determine the component AI with the highest accuracy, Ensemble AI 108 can identify which component AI of the Component AIs 104 used as a result of Input 102 has the most recorded agreements over a particular period of time selected by Ensemble AI 108 or the user. In other embodiments, Ensemble AI 108 determines the component AI with the highest accuracy by identifying which component AI of the Component AIs 104 used as a result of Input 102 has the largest percentage of agreements over a particular period of time selected by Ensemble AI 108 or the user. In such embodiments, the percentage of agreements can correspond to the total number of agreements between embedding vectors recorded for the component AI in relation to the total number of embedding vector comparisons carried out with an embedding vector corresponding to the component AI.

Ensemble AI 108 uses the determined agreements, disagreements, and unique contributions, and the number thereof, across all embedding vectors compared to generate Output 112. To generate a reliable and complete response to Input 102, Ensemble AI 108 first uses any information agreed upon across each component AI. For example, if based on an input of "Give me a biography of George Washington" V1 302, V2 304, V3 306, and VN 308 all agree that George Washington was born in 1732, Ensemble AI 108 will automatically include that information in Output 112. However, if based on an input of "Give me a biography of George Washington" V1 302, V2 304, and V3 306 agree that George Washington was born in Virginia, but VN 308 adds that George Washington was born in Westmoreland County, Virginia, Ensemble AI 108 will, in some embodiments, enter fact-checking mode 110 to confirm the unique contribution of VN 308 before including it in Output 112.

Upon identifying a disagreement or a unique contribution, as referenced above, Ensemble AI 108 initiates a fact-checking mode 110. Fact-checking mode 110 can use the number of agreements, disagreements, and unique contributions recorded to determine the next steps. In some embodiments, when Ensemble AI 108 determines a majority agreement between the embedding vectors compared, Ensemble AI 108 will include the information corresponding to the majority agreement in Output 112. In embodiments where all embedding vectors are compared at once, Ensemble AI 108 determines a majority agreement by comparing the number of agreements of a particular piece of information to the number of disagreements. For example, if based on an input of "Give me a biography of George Washington" V1 302, V2 304, and V3 306 agree that George Washington was born in 1732, but VN 308 states that George Washington was born in 1731, Ensemble AI 108 will disregard VN 308 when generating Output 112.

In embodiments where embedding vectors are compared sequentially, Ensemble AI 108 can determine majority agreement during the sequential comparison process. Then, once a majority agreement is found, the sequential comparison process can terminate. For example, if V1 302 is chosen as the vector to base the comparison on, with an input of "Give me a biography of George Washington," an agreement between V1 302 and both V2 304 and V3 306 may terminate the comparison process. In such an example, the comparison process ends because three of the four possible embedding vectors agree and thus there must be agreement among the majority of embedding vectors. A majority agreement may also be found based on a comparison of agreements to disagreements after working through each sequential comparison.

In some embodiments of the disclosed technology, a user defines a majority agreement threshold (e.g., 51% agreement, 65% agreement, 90% agreement). Such a threshold dictates when the Ensemble AI will find a majority agreement among component AIs and thereby use the agreed upon information in Output 112. The ability to define a majority agreement threshold allows a user to control the reliability and precision of Output 112.

In some embodiments, Ensemble AI 108 searches additional component AI systems when no majority agreement is found among the Component AIs 104. The additional component AI systems are systems like the component AIs described above that were not used originally as part of Component AIs 104. Ensemble AI 108 carries out a comparison process as described above with embedding vectors corresponding to the additional component AI systems. Then, if possible, Ensemble AI 108 determines a majority agreement as described above and then generates Output 112 based on the majority agreement information. If no majority of agreement can be reached on a given topic after using additional component AI systems, then a response from the component AI of the Component AIs 104 that has the most majority topic agreements across the other embedding vector comparisons as a result of Input 102 is used. In other embodiments, when no majority agreement can be reached, Ensemble AI 108 identifies its inability to determine a majority agreement in Output 112.

In some embodiments, when no majority agreement can be reached between compared embedding vectors, Ensemble AI 108 uses the information of the embedding vector from a component AI system with the best track record. The component AI system with the best track record is determined by Ensemble AI 108 by identifying which component AI of the Component AIs 104 used as a result of Input 102 has the most recorded agreements over a particular period of time selected by Ensemble AI 108 or the user. In other embodiments, Ensemble AI 108 determines the component AI with the best track record by identifying which component AI of the Component AIs 104 used as a result of Input 102 has the largest percentage of agreements over a particular period of time selected by Ensemble AI 108 or the user. In such embodiments, the percentage of agreements can correspond to the total number of agreements between embedding vectors recorded for the component AI in relation to the total number of embedding vector comparisons carried out with an embedding vector corresponding to the component AI.

FIG. 4 is a flow diagram illustrating an example system to improve AI responses by comparison that determines agreements and disagreements between AI systems. At 400 the system obtains an input. The input is a natural language prompt, a natural language query, or both.

At 410 the system submits the input to a first component artificial intelligence (AI), a second component AI, and a third component AI. Each of the first component AI, the second component AI, and the third component AI return a first natural language response, a second natural language response, and a third natural language response to the input. In some embodiments, the first, second, and third component AIs are pre-selected for input submission by a user of the system. In some embodiments, the first, second, and third component AIs are selected for input submission by the system based on a subject matter, prompt type, or query type determined by the system.

At 420 the system obtains a first embedding vector from the first component AI, a second embedding vector from the second component AI, and a third embedding vector from the third component AI. The first embedding vector corresponds to a first simple sentence of the first natural language response, the second embedding vector corresponds to a second simple sentence of the second natural language response, and the third embedding vector corresponds to a third simple sentence of the third natural language response. Each embedding vector is a numerical vector in a multidimensional space.

At 430 the system compares the first embedding vector to the second embedding vector to detect a first agreement. The system detects the first agreement by comparing a first distance between the first embedding vector and the second embedding vector to a first threshold distance. The first distance is a cosine similarity value between the first embedding vector and the second embedding vector. The first threshold distance is 1. When the first distance is substantially similar (e.g., between 0.7 and 1) to the first threshold distance of 1, the system detects the first agreement.

At 440 if the system fails to detect the first agreement between the first embedding vector and the second embedding vector, the system determines whether to present the first simple sentence or the second simple sentence to a user by comparing the first embedding vector and the third embedding vector to detect a second agreement or a second disagreement. To detect the second agreement, the system compares a second distance between the first embedding vector and the third embedding vector to the first threshold distance. The second distance is a cosine similarity value between the first embedding vector and third embedding vector. When the second distance is substantially similar (e.g., between 0.7 and 1) to the first threshold distance of 1, the system detects the second agreement. To detect the first disagreement, the system compares a third distance between the first embedding vector and the third embedding vector to a second threshold distance. The third distance is a cosine similarity value between the first embedding vector and the third embedding vector. The second threshold distance is −1. When the third distance is substantially similar (e.g., between −0.7 and −1) to the second threshold distance of −1, the system detects the first disagreement.

In some embodiments, the system compares the first embedding vector to the second embedding vector to detect a second disagreement. To detect the second disagreement, the system compares a distance between the first embedding vector and the second embedding vector to the second threshold distance. The distance between the first embedding vector and the second embedding vector is a cosine similarity value. When the distance between the first embedding vector and the second embedding vector is substantially similar (e.g., between −0.7 and −1) to the second threshold distance of −1, the system detects the second disagreement.

In some embodiments, the system records when the first or second disagreement is identified. Upon recording a first or second disagreement, the system increases a first disagreement total or a second disagreement total depending on which disagreement is identified. The system then compares the first and second disagreement total to a disagreement threshold, which can be a predetermined integer value. If the first disagreement total or the second disagreement total exceeds the disagreement threshold, the system replaces the second component AI or the third component AI with a fourth component AI, respectively.

At 450 the system presents, upon detecting the second agreement, to the user, an output natural language response. The output natural language response is based on the first simple sentence, the third simple sentence, or both. In some embodiments, upon detecting the second agreement, the system presents an output natural language response to the user that excludes the second simple sentence. In some embodiments, the output natural language response is structured as a list, a paragraph, or both.

FIG. 5 is a flow diagram illustrating an example system to improve AI responses by comparison that determines a unique contribution between AI systems. At 500 the system obtains an input. The input is a natural language prompt, a natural language query, or both.

At 510 the system submits the input to a first component artificial intelligence (AI), a second component AI, and a third component AI. Each of the first component AI, the second component AI, and the third component AI returns a first natural language response, a second natural language response, and a third natural language response to the input. In some embodiments, the first, second, and third component AIs are pre-selected for input submission by a user of the system. In some embodiments, the first, second, and third component AIs are selected for input submission by the system based on a subject matter, prompt type, or query type determined by the system.

At 520 the system obtains a first embedding vector from the first component AI, a second embedding vector from the second component AI, and a third embedding vector from the third component AI. The first embedding vector corresponds to a first simple sentence of the first natural language response, the second embedding vector corresponds to a second simple sentence of the second natural language response, and the third embedding vector corresponds to a third simple sentence of the third natural language response. Each embedding vector is a numerical vector in a multidimensional space.

At 530 the system compares the first embedding vector to the second embedding vector to detect a first unique contribution. To detect the first unique contribution, the system compares a fourth distance between the first embedding vector and the second embedding vector to a third threshold distance. The fourth distance is a cosine similarity value between the first embedding vector and the second embedding vector. The third threshold distance is 0. When the fourth distance between the first embedding vector and the second embedding vector is substantially similar (e.g., between −0.3 and 0.3) to the third threshold distance of 0, the system detects the first unique contribution.

At 540 in response to detecting the first unique contribution, the system compares the second embedding vector and the third embedding vector to detect a second unique contribution. Detecting the second unique contribution comprises comparing a fifth distance between the second embedding vector and the third embedding vector to the third threshold distance. The fifth distance is a cosine similarity value between the second embedding vector and the third embedding vector. When the fifth distance between the second embedding vector and the third embedding vector is substantially similar (e.g., between –0.3 and 0.3) to the third threshold distance of 0, the system detects the second unique contribution.

At 550 the system presents, upon detecting the first and second unique contribution, to the user, the output natural language response. The output natural language response is based on the second simple sentence.

Transformer for Neural Network

Figure 6:
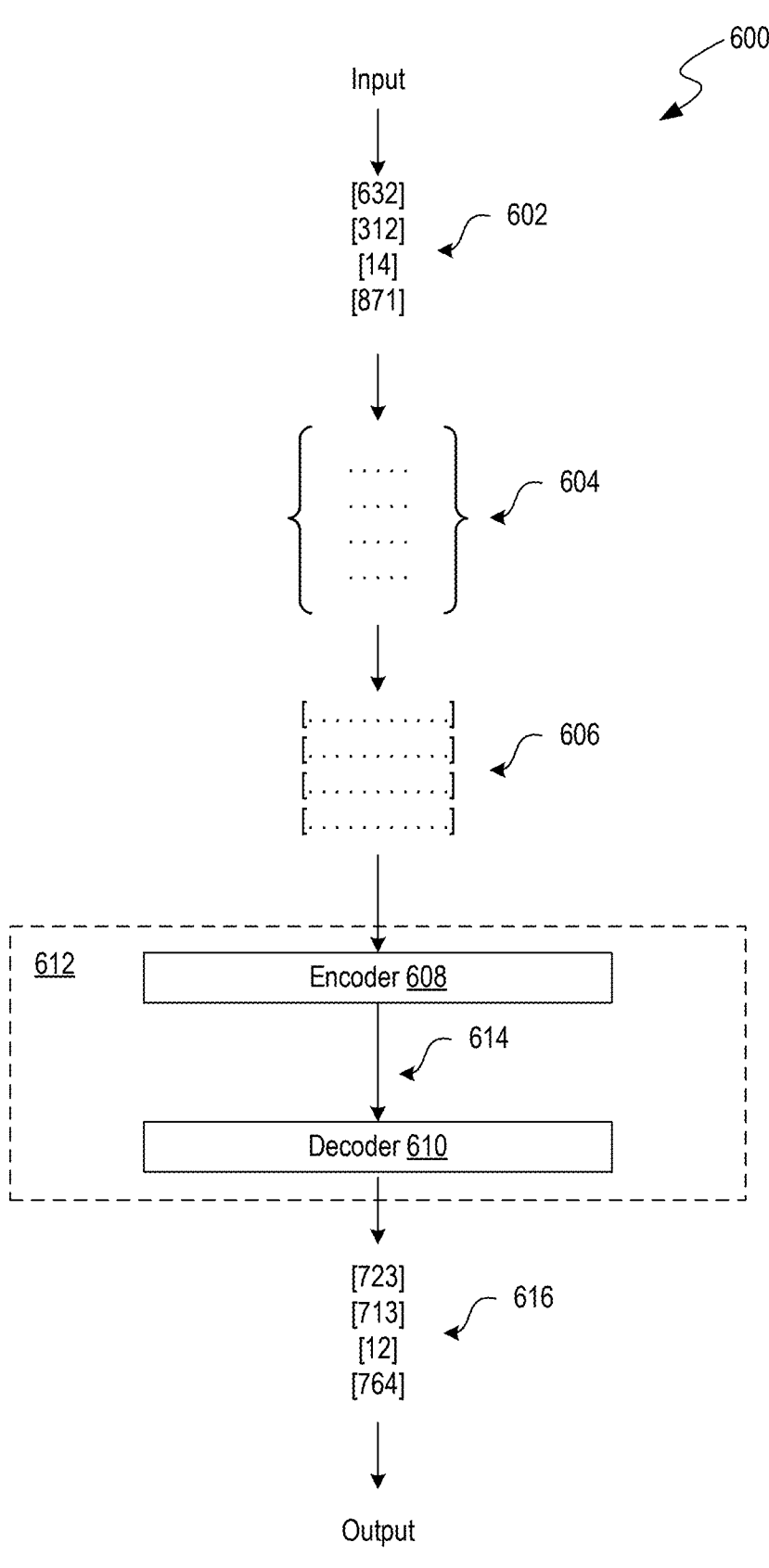
FIG. 6 is a block diagram of an example transformer.

To assist in understanding the present disclosure, some concepts relevant to AI 600 in FIG. 6 including neural networks and machine learning (ML) are discussed herein. As described in this application, AI 600 can be used to analyze content of multiple messages to determine grouping of the multiple messages, and/or to suggest a visual indicator for the grouping of the multiple messages.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), generative adversarial networks (GANs), variational autoencoders (VAEs), and autoregressive models, among others.

DNNs are often used as ML-based models for modeling complex behaviors (e.g., human language, image recognition, object classification, etc.) in order to improve the accuracy of outputs (e.g., more accurate predictions), for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimizing a loss or maximizing a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performance-trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistants).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

FIG. 6 is a block diagram of an example transformer 612. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 612 includes an encoder 608 (which can include one or more encoder layers/blocks connected in series) and a decoder 610 (which can include one or more decoder layers/blocks connected in series). Generally, the encoder 608 and the decoder 610 each include multiple neural network layers, at least one of which can be a self-attention layer. The parameters of the neural network layers can be referred to as the parameters of the language model.

The transformer 612 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 6 illustrates an example of how the transformer 612 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, and other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 612 can be of any length up to a maximum length defined based on the dimensions of the transformer 612. Each token 602 in the token sequence is converted into an embedding vector 606 (also referred to as "embedding 606").

An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some implementations, the numerical value of the token 602 can be used to look up the corresponding embedding in an embedding matrix 604, which can be learned during training of the transformer 612.

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as a latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 can generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some implementations, the input provided to the transformer 612 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use autoregression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 7:
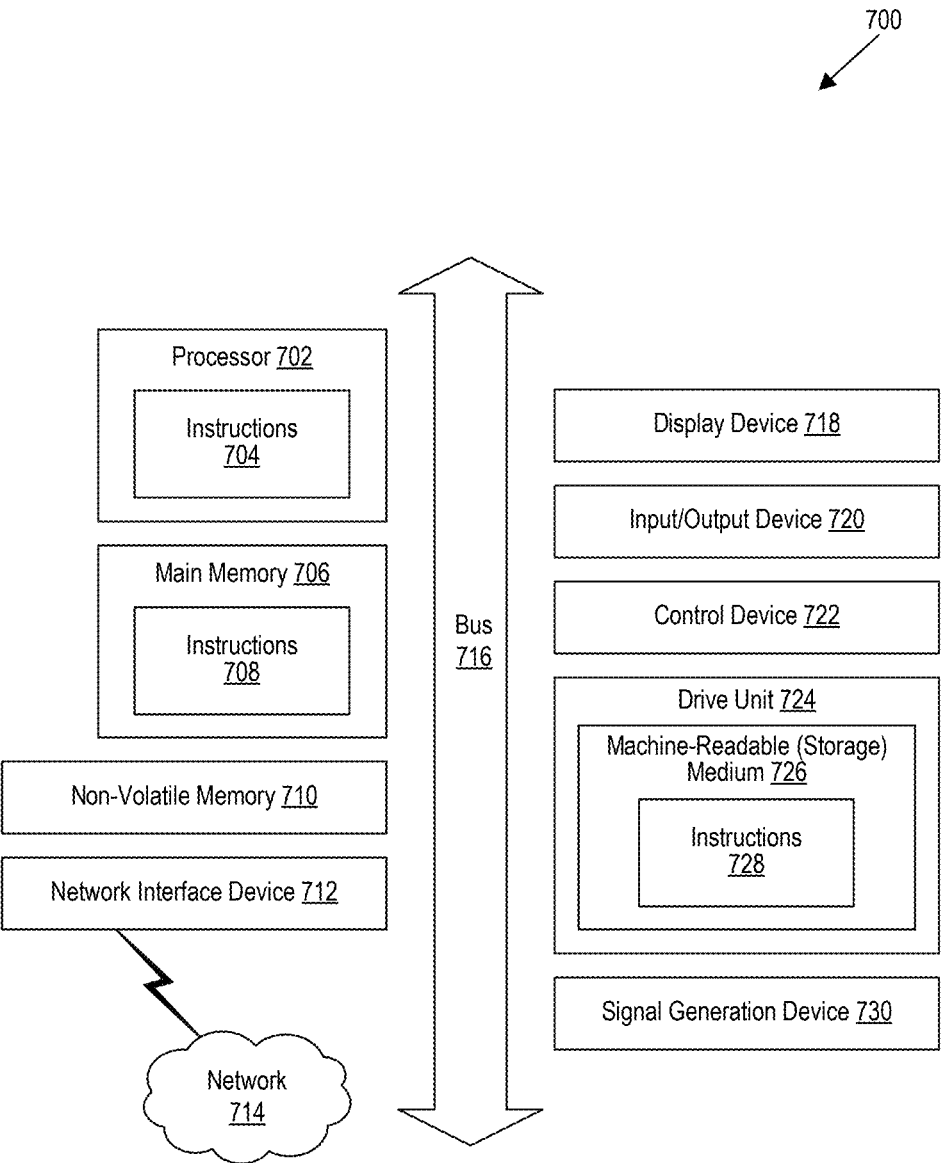
FIG. 7 is a block diagram that illustrates an example of a computer system 700 in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the Figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Figure 8:
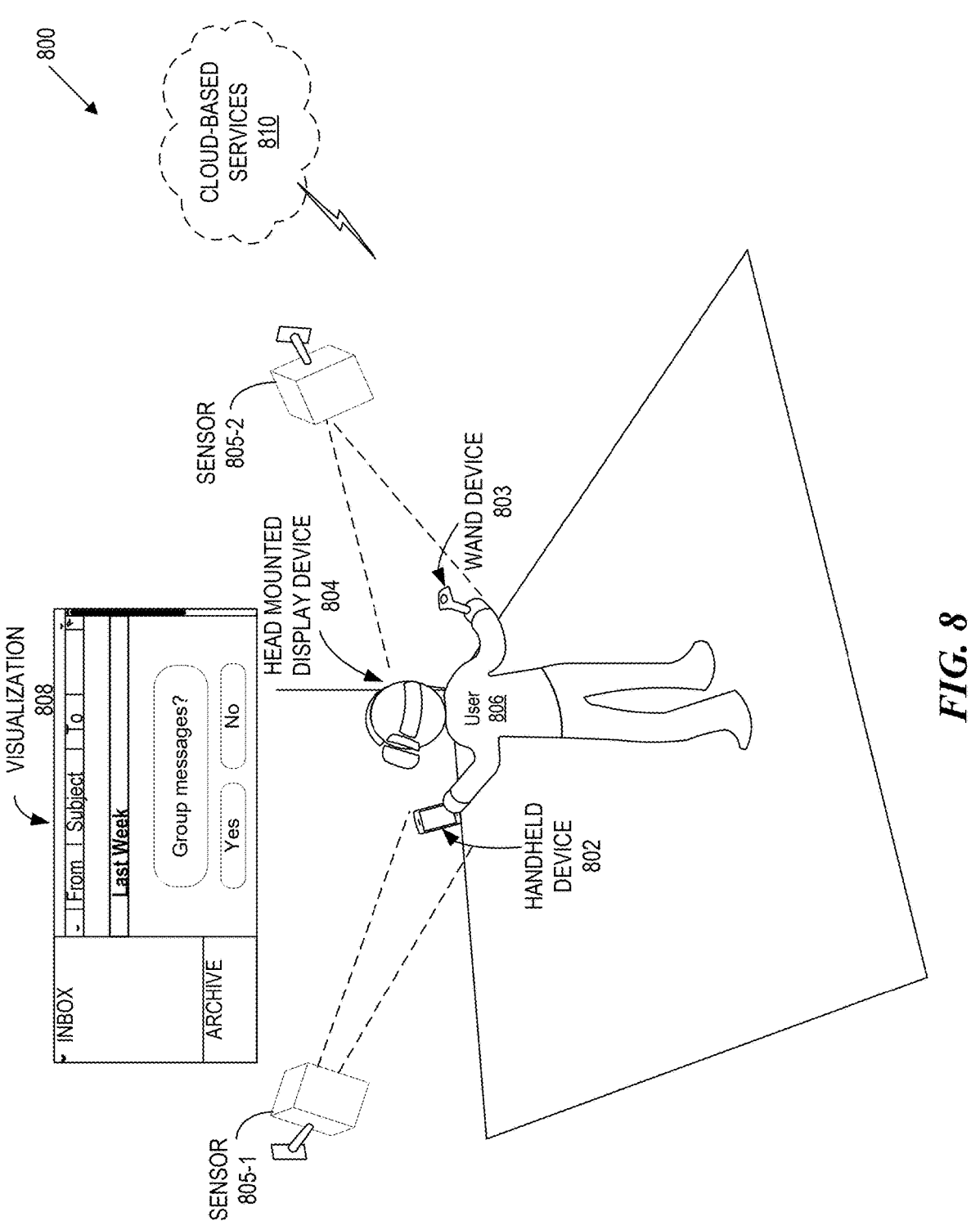
FIG. 8 illustrates a user engaged with a mixed reality system for immersive message management.

FIG. 8 illustrates a user engaged with a mixed reality system 800 for immersive message management. The components of the system 800 can include a handheld device 802 that administers a session running on other components of the system 800 including a head-mounted display (HMD) device 804 that renders a partial or full 360-degree interface. The system 800 can also include motion or position sensors 805-1 and 805-2, which are fixed in a room or worn by the user 806 such as, for example, sensors of wearables. The HMD device 804 can be an AR/VR/XR device. In some embodiments the HMD device 804 can include glasses.

A near-eye display device, commonly referred to as an HMD device, is an optical apparatus designed to present visual information directly in front of the user's eyes. This technology is composed of several integral components that work in unison to deliver a seamless and immersive visual experience.

Central to the near-eye display device lies the optical module. The optical module includes lenses and other optical elements that project images from a microdisplay or similar image source directly into the user's eyes. The optical module is engineered to ensure that the images are clear, focused, and appear at a comfortable viewing distance, thereby enhancing the overall user experience.

The microdisplay is a small yet high-resolution display panel responsible for generating the visual content. Utilizing technologies such as Liquid Crystal Display (LCD), Organic Light Emitting Diode (OLED), Liquid Crystal on Silicon (LCoS), or Digital Light Processing (DLP), the microdisplay renders the images or video content that the user perceives.

Supporting these components is the frame and housing, which provides the structural integrity needed to hold the optical module and microdisplay in place. Designed to be lightweight and comfortable for extended wear, the frame often includes adjustable straps or other mechanisms to ensure a secure and personalized fit on the user's head.

Modern near-eye display devices are equipped with an array of sensors, including accelerometers, gyroscopes, magnetometers, and eye-tracking sensors. These sensors enable head tracking, motion detection, and gaze tracking, significantly enhancing the interactivity and immersive nature of the device. The data collected by these sensors is processed by a built-in or connected processing unit, which handles the computation required for rendering images, processing sensor data, and managing user inputs. This processing unit may be integrated into the device or connected via a wired or wireless link to an external computer or mobile device.

Connectivity interfaces such as USB, HDMI, Bluetooth, or Wi-Fi are also integral to the device, allowing it to interface with external devices, transfer data, or receive content. The power supply, typically a battery or power management system, provides the necessary energy to operate the device efficiently, supporting extended usage without frequent recharging.

User interaction with the near-eye display device is facilitated through various user interface options, including physical buttons, touchpads, voice control, or gesture recognition systems. Additionally, some devices feature integrated speakers or headphone jacks to provide audio output, further enhancing the multimedia experience.

As illustrated, the handheld device 802 operates as a wand to navigate objects of the visualization 808 experienced by the user 806 through the HMD device 804. A dedicated wand device 803 (e.g., with one or more dedicated hardware buttons) can additionally or alternatively be used for navigation. In another example, the sensors 805-1 and 805-2 can detect the position and/or movement of the user's finger in the air to perform the functions including the examples illustrated in FIGS. 1 through 4, which could be rendered in a mixed reality session, e.g., on the handheld device 802. For example, the queries regarding grouping of messages, or the queries regarding visualizations of group messages can be presented to the user 806 through the visualization 808.

In some embodiments, some components of the system 800 are remotely located from the user. For example, cloud components can provide cloud-based services 810 to administer the mixed reality session running on the components of the system 800 or provide services or content for a mixed reality session. Hence, administration of a mixed reality session could be through the HMD device 804, augmented with the handheld device 802, and/or with the cloud-based services 810 that receives session progress feedback (e.g., anywhere outside of a room where the user is experiencing a simulation).

As shown, the HMD device 804 can provide content (e.g., visualization 808) of a mixed reality session and process feedback from the user via the handheld device 802 to navigate the visualization 808. As shown, the HMD device 804 is a near-to-eye display system that is worn by the user 806. For example, the HMD device 804 can have a chassis and various electrical and optical components to enable an immersive experience by the user 806 wearing the HMD device 804. For example, the HMD device 804 can include a display for each of the user's eyes. The displays can render a real-world scene of a simulation for view by the user's eyes when the HMD device 804 is worn by the user. The HMD device 804 can also include a camera mounted to the chassis. The camera can capture movement of the user's pupils for physiological feedback responsive to simulated scenes being rendered. The HMD device 804 may also include a network interface enabling the handheld device 802 to communicatively couple to the HMD device 804 over a wireless connection.

In some embodiments, the HMD device 804 includes features for measuring the user's physiological activity. For example, the HMD device 804 can include components to measure the user's electrical brain activity. As such, the HMD device 804 can collect physiological data in combination with any direct input by the user. In some embodiments, the physiological data can be used to supplement the user's conscious inputs. In some embodiments, the physiological data could be used to compare against the user's conscious input.

In one example, the HMD device 804 can render a virtual immersive environment by displaying images in view of the user's eyes such that the user can only see the images (e.g., visualization 808) and see nothing of the real-world. The HMD device 804 can also render an AR environment. As such, the user can see the visualization 808 overlaying the real world while the HMD device 804 is worn by the user 806. Hence, to achieve an AR environment, the user in an augmented reality simulation has a transparent view with digital objects overlaid or superimposed on the user's real-world view.

Examples of the sensors 805-1 and 805-2 include cameras or motion detectors that are positioned proximate to the user such that the sensors 805-1 and 805-2 can obtain real-world feedback responsive to interactions with a simulated real-world scene. For example, cameras facing the user can detect the user 606's movement while the user is engaged in a simulation and provide feedback to the HMD device 804 administering the simulation. The handheld device 802 can be used by the user 806 to submit input, which can include actuating buttons for the user 806 to input data and/or accelerometers that detect spatial movement. For example, the user 806 can move the handheld device 802 to provide inputs responsive to a scene administered by the HMD device 804.

The visualization 808 is one example of many that can be rendered in a mixed reality session. FIGS. 1-4 show examples of visualizations that could likewise be rendered in a mixed reality session. The user 806 can select and move objects of the visualization 808 in a manner described with respect to FIGS. 1-4. As described further below, the system 800 can include servers that are remotely located from the user 806 and can access a program administered by the HMD device 804. Further, a local software generation and distribution framework can be used to rapidly scale content. The core components and services can support complex user and session elements that can be easily managed by a service provider. As such, a platform of a mixed reality system can standardize interaction elements such as a session landing, sign-in, navigation rules, and the like. A top-level abstraction layer can support customization such as a sequence of sessions or scenes or conditional ordering of sessions or scenes. Services can include authentication, tracking, reports, user services, help services, pause and resume services, and the like.

Figure 9:
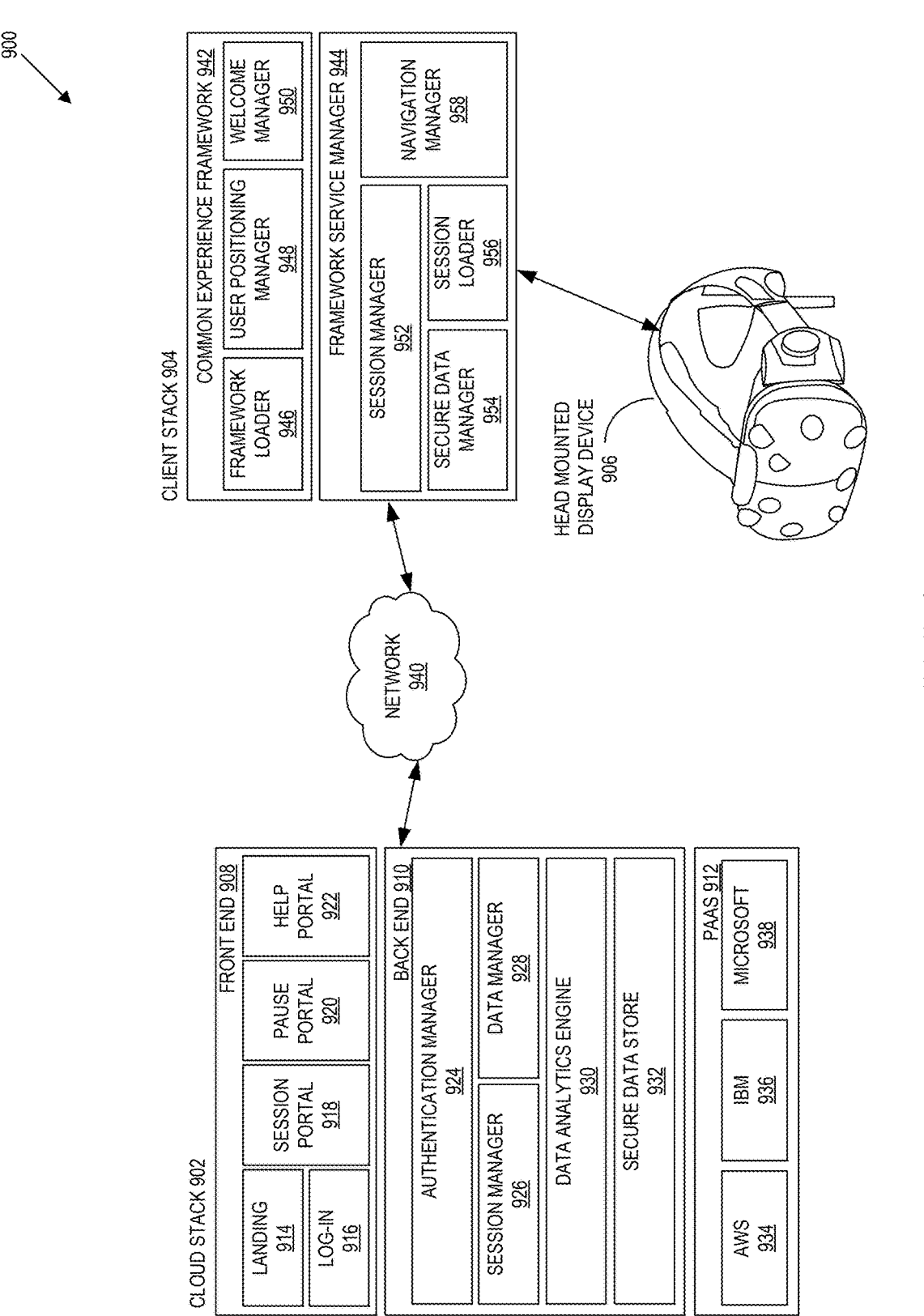
FIG. 9 is a block diagram illustrating a cloud stack and a client stack architecture for a platform that can collectively administer a mixed reality session on a head-mounted display (HMD) device 906.

FIG. 9 is a block diagram illustrating a cloud stack 902 and a client stack 904 architecture for a platform 900 that can collectively administer a mixed reality session on an HMD device 906. As shown, the cloud stack 902 includes three primary layers: a front end layer 908, a back end layer 910, and a platform as a service (PaaS) layer 912. The front end layer 908 includes a landing component 914 and a login component 916. The two components 914 and 916 are executed at the beginning of a session administered to orient a user and seek login credentials to control access to message programs and user information of the platform 900. The front end layer 908 also includes a session portal 918, pause portal 920, and help portal 922. The session portal 918 is for normal front-facing operations of a simulation session whereas the pause portal 920 is for operations while the session is paused. Lastly, the help portal 922 can help the user or administrator to address questions related to the platform 900 or simulation.

The back end layer 910 includes an authentication manager 924 that can authenticate a user and/or an administrator of the platform 900. A session manager 926 can manage access to a particular session. A data manager 928 can manage user data and/or data about the session such as any feedback from users while engaged in sessions. For example, the data manager 928 can collect feedback data from multiple users including their inputs and physiological data. A data analytics engine 930 can process the collected data to determine the actions of users and to learn how to improve the sessions (e.g., mixed reality scenes). A secure data store 932 can store sensitive data such as data that identifies users. Lastly, the PaaS layer 912 includes cloud computing services that provide the platform 900 for clients to administer the mixed reality sessions. Examples include AMAZON WEB SERVICES (AWS) 934, or services provided by IBM 936 and/or MICROSOFT 938.

The cloud stack 902 is communicatively connected to the client stack 904 over a network 940 such as the internet. The client stack 904 includes a common experience framework layer 942 and a framework service manager layer 944. The common experience framework layer 942 includes a framework loader 946 to load the framework for a session, a user positioning manager 948 to monitor and track the relative position of the user engaged with the session, and a welcome manager 950 to orient the user at the beginning of the session.

The framework service manager layer 944 includes a session manager 952 to manage the session experienced by a user wearing the HMD device 906. The framework service manager layer 944 also includes a secure data manager 954 to store or anonymize any sensitive data, session load manager 956 for loading a session, and a navigation manager 958 for navigating a user through mixed reality scenes of a message management program. The platform 900 is merely illustrative to aid the reader in understanding an embodiment. Other embodiments may include fewer or additional layers/components known to persons skilled in the art but omitted for brevity.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above and any that may be listed in accompanying filing papers are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium for improving artificial intelligence (AI) system output comprising instructions recorded thereon, wherein the instructions, when executed by at least one data processor of a system, cause the system to:

obtain an input,
   wherein the input is a natural language prompt, a natural language query, or both;

submit the input to a first component AI, a second component AI, and a third component AI,
   wherein the first component AI returns a first natural language response to the input;
   wherein the second component AI returns a second natural language response to the input;
   wherein the third component AI returns a third natural language response to the input;
   wherein the first component AI, the second component AI, and the third component AI are different component AIs;

obtain a first embedding vector from the first component AI, a second embedding vector from the second component AI, and a third embedding vector from the third component AI,
   wherein the first embedding vector corresponds to a first simple sentence of the first natural language response;
   wherein the second embedding vector corresponds to a second simple sentence of the second natural language response;
   wherein the third embedding vector corresponds to a third simple sentence of the third natural language response;
   wherein the first embedding vector, the second embedding vector, and the third embedding vector are numerical vectors in a multidimensional space;

compare the first embedding vector to the second embedding vector to detect a first agreement,
   wherein detecting the first agreement comprises comparing a first distance between the first embedding vector and the second embedding vector to a first threshold distance;

in response to failing to detect the first agreement between the first embedding vector and the second embedding vector, determine whether to present the first simple sentence or the second simple sentence to a user by comparing the first embedding vector and the third embedding vector to detect a second agreement or a second disagreement,
   wherein detecting the second agreement comprises comparing a second distance between the first embedding vector and the third embedding vector to the first threshold distance;
   wherein detecting a first disagreement comprises comparing a third distance between the first embedding vector and the third embedding vector to a second threshold distance; and present, upon detecting the second agreement, to the user, an output natural language response,
   wherein the output natural language response is based on the first simple sentence, the third simple sentence, or both, and wherein the output natural language response represents an improved AI system output as a result of basin the output natural language response on the first simple sentence, the third simple sentence, or both upon detecting the second agreement.

2. The non-transitory, computer-readable storage medium of claim 1, comprising instructions to:

compare the first embedding vector to the second embedding vector to detect a first unique contribution, wherein detecting the first unique contribution comprises comparing a fourth distance between the first embedding vector and the second embedding vector to a third threshold distance;

in response to detecting the first unique contribution, compare the second embedding vector and the third embedding vector to detect a second unique contribution, wherein detecting the second unique contribution comprises comparing a fifth distance between the third embedding vector and the second embedding vector to the third threshold distance; and present, upon detecting the first and second unique contribution, to the user, the output natural language response, wherein the output natural language response is based on the second simple sentence.

3. The non-transitory, computer-readable storage medium of claim 2, comprising instructions to:

detect the first unique contribution in response to detecting that the fourth distance is approximately equal to the third threshold distance, wherein the fourth distance is a fifth cosine similarity value between the first embedding vector and the second embedding vector;

wherein the third threshold distance is substantially similar to 0; and detect the second unique contribution in response to detecting that the fifth distance is approximately equal to the third threshold distance, wherein the fifth distance is a sixth cosine similarity value between the second embedding vector and the third embedding vector;

wherein the third threshold distance is substantially similar to 0.

4. The non-transitory, computer-readable storage medium of claim 1, comprising instructions to:

detect the first agreement in response to detecting that the first distance is approximately equal to the first threshold distance, wherein the first distance is a first cosine similarity value between the first embedding vector and the second embedding vector;

wherein the first threshold distance is substantially similar to 1;

detect the second agreement in response to detecting that the second distance is approximately equal to the first threshold distance, wherein the second distance is a third cosine similarity value between the first embedding vector and the third embedding vector;

wherein the first threshold distance is substantially similar to 1;

detect the first disagreement in response to detecting that the third distance is approximately equal to the second threshold distance, wherein the third distance is a fourth cosine similarity value between the first embedding vector and the third embedding vector;

wherein the second threshold distance is substantially similar to −1; and detect a second disagreement in response to detecting that a sixth distance is approximately equal to the second threshold distance, wherein the sixth distance is a second cosine similarity value between the first embedding vector and the second embedding vector;

wherein the second threshold distance is substantially similar to −1.

5. The non-transitory, computer-readable storage medium of claim 1, comprising instructions to:

present, upon detecting the second agreement, to the user, the output natural language response, wherein the output natural language response excludes the second simple sentence.

6. The non-transitory, computer-readable storage medium of claim 1, comprising instructions to:

submit the input to the first component AI, the second component AI, and the third component AI, wherein the first component AI, the second component AI, and the third component AI are pre-selected by the user.

7. The non-transitory, computer-readable storage medium of claim 1, comprising instructions to:

determine a subject matter, a prompt type, or a query type of the input; and select the first component AI, the second component AI, and the third component AI based on the subject matter, the prompt type, or the query type of the input.

8. The non-transitory, computer-readable storage medium of claim 1, comprising instructions to:

record the second disagreement, wherein recording the second disagreement increases a second disagreement total;

compare the second disagreement total to a disagreement threshold, wherein the disagreement threshold is a predetermined integer; and in response to detecting that the second disagreement total exceeds the disagreement threshold, replace the third component AI with a fourth component AI.

9. The non-transitory, computer-readable storage medium of claim 1, comprising instructions to:

present the output natural language response, wherein the output natural language response is structured as a list, a paragraph, or both.

10. The non-transitory, computer-readable storage medium of claim 1, comprising instructions to:

present the output natural language response on a virtual reality, augmented reality, or mixed reality device; and navigate the output natural language response via a wand device associated with the virtual reality, augmented reality, or mixed reality device.

11. A method for improving artificial intelligence (AI) system output, the method comprising:

obtaining an input, wherein the input is a natural language prompt, a natural language query, or both;

submitting the input to a first component AI, a second component AI, and a third component AI, wherein the first component AI returns a first natural language response to the input;

wherein the second component AI returns a second natural language response to the input;

wherein the third component AI returns a third natural language response to the input;

wherein the first component AI, the second component AI, and the third component AI are different component AIs;

obtaining a first embedding vector from the first component AI, a second embedding vector from the second component AI, and a third embedding vector from the third component AI, wherein the first embedding vector corresponds to a first simple sentence of the first natural language response;

wherein the second embedding vector corresponds to a second simple sentence of the second natural language response;

wherein the third embedding vector corresponds to a third simple sentence of the third natural language response;

wherein the first embedding vector, the second embedding vector, and the third embedding vector are numerical vectors in a multidimensional space;

comparing the first embedding vector to the second embedding vector to detect a first agreement, wherein detecting the first agreement comprises comparing a first distance between the first embedding vector and the second embedding vector to a first threshold distance;

in response to failing to detect the first agreement between the first embedding vector and the second embedding vector, determining whether to present the first simple sentence or the second simple sentence to a user by comparing the first embedding vector and the third embedding vector to detect a second agreement or a second disagreement, wherein detecting the second agreement comprises comparing a second distance between the first embedding vector and the third embedding vector to the first threshold distance;

wherein detecting a first disagreement comprises comparing a third distance between the first embedding vector and the third embedding vector to a second threshold distance; and presenting, upon detecting the second agreement, to the user, an output natural language response, wherein the output natural language response is based on the first simple sentence, the third simple sentence, or both, and wherein the output natural language response represents an improved AI system output as a result of basing the output natural language response on the first simple sentence, the third simple sentence, or both upon detecting the second agreement.

12. The method of claim 11, further comprising:

comparing the first embedding vector to the second embedding vector to detect a first unique contribution, wherein detecting the first unique contribution comprises comparing a fourth distance between the first embedding vector and the second embedding vector to a third threshold distance;

in response to detecting the first unique contribution, comparing the second embedding vector and the third embedding vector to detect a second unique contribution, wherein detecting the second unique contribution comprises comparing a fifth distance between the third embedding vector and the second embedding vector to the third threshold distance; and presenting, upon detecting the first and second unique contribution, to the user, the output natural language response, wherein the output natural language response is based on the second simple sentence.

13. The method of claim 12, further comprising:

detecting the first unique contribution in response to detecting that the fourth distance is approximately equal to the third threshold distance, wherein the fourth distance is a fifth cosine similarity value between the first embedding vector and the second embedding vector;

wherein the third threshold distance is substantially similar to 0; and detecting the second unique contribution in response to detecting that the fifth distance is approximately equal to the third threshold distance, wherein the fifth distance is a sixth cosine similarity value between the second embedding vector and the third embedding vector;

wherein the third threshold distance is substantially similar to 0.

14. The method of claim 11, further comprising:

detecting the first agreement in response to detecting that the first distance is approximately equal to the first threshold distance, wherein the first distance is a first cosine similarity value between the first embedding vector and the second embedding vector;

wherein the first threshold distance is substantially similar to 1;

detecting the second agreement in response to detecting that the second distance is approximately equal to the first threshold distance, wherein the second distance is a third cosine similarity value between the first embedding vector and the third embedding vector;

wherein the first threshold distance is substantially similar to 1;

detecting the first disagreement in response to detecting that the third distance is approximately equal to the second threshold distance, wherein the third distance is a fourth cosine similarity value between the first embedding vector and the third embedding vector;

wherein the second threshold distance is substantially similar to −1; and detecting a second disagreement in response to detecting that a sixth distance is approximately equal to the second threshold distance, wherein the sixth distance is a second cosine similarity value between the first embedding vector and the second embedding vector;

wherein the second threshold distance is substantially similar to −1.

15. The method of claim 11, further comprising:

presenting, upon detecting the second agreement, to the user, the output natural language response, wherein the output natural language response excludes the second simple sentence.

16. The method of claim 11, further comprising:

submitting the input to the first component AI, the second component AI, and the third component AI, wherein the first component AI, the second component AI, and the third component AI are pre-selected by the user.

17. The method of claim 11, further comprising:

determining a subject matter, a prompt type, or a query type of the input; and selecting the first component AI, the second component AI, and the third component AI based on the subject matter, the prompt type, or the query type of the input.

18. The method of claim 11, further comprising:

recording the second disagreement, wherein recording the second disagreement increases a second disagreement total;

comparing the second disagreement total to a disagreement threshold, wherein the disagreement threshold is a predetermined integer; and in response to detecting that the second disagreement total exceeds the disagreement threshold, replacing the third component AI with a fourth component AI.

19. The method of claim 11, further comprising:

presenting the output natural language response, wherein the output natural language response is structured as a list, a paragraph, or both.

20. The method of claim 11, further comprising:

presenting the output natural language response on a virtual reality, augmented reality, or mixed reality device; and navigating the output natural language response via a wand device associated with the virtual reality, augmented reality, or mixed reality device.

21. A system for improving artificial intelligence (AI) system output, the system comprising:

at least one hardware processor; and at least one non-transitory memory storing instructions, which, when executed by the at least one hardware processor, cause the system to:

obtain an input, wherein the input is a natural language prompt, a natural language query, or both;

submit the input to a first component AI, a second component AI, and a third component AI, wherein the first component AI returns a first natural language response to the input;

wherein the second component AI returns a second natural language response to the input;

wherein the third component AI returns a third natural language response to the input;

wherein the first component AI, the second component AI, and the third component AI are different component AIs;

obtain a first embedding vector from the first component AI, a second embedding vector from the second component AI, and a third embedding vector from the third component AI, wherein the first embedding vector corresponds to a first simple sentence of the first natural language response;

wherein the second embedding vector corresponds to a second simple sentence of the second natural language response;

wherein the third embedding vector corresponds to a third simple sentence of the third natural language response;

wherein the first embedding vector, the second embedding vector, and the third embedding vector are numerical vectors in a multidimensional space;

compare the first embedding vector to the second embedding vector to detect a first agreement, wherein detecting the first agreement comprises comparing a first distance between the first embedding vector and the second embedding vector to a first threshold distance;

in response to failing to detect the first agreement between the first embedding vector and the second embedding vector, determine whether to present the first simple sentence or the second simple sentence to a user by comparing the first embedding vector and the third embedding vector to detect a second agreement or a second disagreement, wherein detecting the second agreement comprises comparing a second distance between the first embedding vector and the third embedding vector to the first threshold distance;

wherein detecting a first disagreement comprises comparing a third distance between the first embedding vector and the third embedding vector to a second threshold distance; and present, upon detecting the second agreement, to the user, an output natural language response, wherein the output natural language response is based on the first simple sentence, the third simple sentence, or both, and wherein the output natural language response represents an improved AI system output as a result of basing the output natural language response on the first simple sentence, the third simple sentence, or both upon detecting the second agreement.

22. The system of claim 21, comprising instructions to:

compare the first embedding vector to the second embedding vector to detect a first unique contribution, wherein detecting the first unique contribution comprises comparing a fourth distance between the first embedding vector and the second embedding vector to a third threshold distance;

in response to detecting the first unique contribution, compare the second embedding vector and the third embedding vector to detect a second unique contribution, wherein detecting the second unique contribution comprises comparing a fifth distance between the third embedding vector and the second embedding vector to the third threshold distance; and present, upon detecting the first and second unique contribution, to the user, the output natural language response, wherein the output natural language response is based on the second simple sentence.

23. The system of claim 22, comprising instructions to:

detect the first unique contribution in response to detecting that the fourth distance is approximately equal to the third threshold distance, wherein the fourth distance is a fifth cosine similarity value between the first embedding vector and the second embedding vector;

wherein the third threshold distance is substantially similar to 0; and detect the second unique contribution in response to detecting that the fifth distance is approximately equal to the third threshold distance, wherein the fifth distance is a sixth cosine similarity value between the second embedding vector and the third embedding vector;

wherein the third threshold distance is substantially similar to 0.

24. The system of claim 21, comprising instructions to:
detect the first agreement in response to detecting that the first distance is approximately equal to the first threshold distance,
wherein the first distance is a first cosine similarity value between the first embedding vector and the second embedding vector;
wherein the first threshold distance is substantially similar to 1;
detect the second agreement in response to detecting that the second distance is approximately equal to the first threshold distance,
wherein the second distance is a third cosine similarity value between the first embedding vector and the third embedding vector;
wherein the first threshold distance is substantially similar to 1;
detect the first disagreement in response to detecting that the third distance is approximately equal to the second threshold distance,
wherein the third distance is a fourth cosine similarity value between the first embedding vector and the third embedding vector;
wherein the second threshold distance is substantially similar to −1; and
detect a second disagreement in response to detecting that a sixth distance is approximately equal to the second threshold distance,
wherein the sixth distance is a second cosine similarity value between the first embedding vector and the second embedding vector;
wherein the second threshold distance is substantially similar to −1.

25. The system of claim 21, comprising instructions to:
present, upon detecting the second agreement, to the user, the output natural language response, wherein the output natural language response excludes the second simple sentence.

26. The system of claim 21, comprising instructions to:
submit the input to the first component AI, the second component AI, and the third component AI,
wherein the first component AI, the second component AI, and the third component AI are pre-selected by the user.

27. The system of claim 21, comprising instructions to:
determine a subject matter, a prompt type, or a query type of the input; and
select the first component AI, the second component AI, and the third component AI based on the subject matter, the prompt type, or the query type of the input.

28. The system of claim 21, comprising instructions to:
record the second disagreement,
wherein recording the second disagreement increases a second disagreement total;
compare the second disagreement total to a disagreement threshold,
wherein the disagreement threshold is a predetermined integer; and
in response to detecting that the second disagreement total exceeds the disagreement threshold, replace the third component AI with a fourth component AI.

29. The system of claim 21, comprising instructions to:
present the output natural language response,
wherein the output natural language response is structured as a list, a paragraph, or both.

30. The system of claim 21, comprising instructions to:
present the output natural language response on a virtual reality, augmented reality, or mixed reality device; and
navigate the output natural language response via a wand device associated with the virtual reality, augmented reality, or mixed reality device.

* * * * *